US012243401B2

(12) United States Patent
Wang et al.

(10) Patent No.: US 12,243,401 B2
(45) Date of Patent: *Mar. 4, 2025

(54) PORTIONS OF A SECURITY DEVICE SYSTEM; METHODS OF MAKING AND USING THEM

(71) Applicant: Hangzhou Timing Security Technologies Co., Ltd., Hangzhou PRC (CN)

(72) Inventors: Hexiao Wang, Hangzhou PRC (CN); Peter A. Morello, Jr., Stuart, FL (US); Lin Wang, Hangzhou PRC (CN); Peter Morello, Sr., Stuart, FL (US)

(73) Assignee: Hangzhou Timing Security Technologies Co., Ltd., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,351

(22) Filed: Oct. 10, 2023

(65) Prior Publication Data

US 2024/0038036 A1 Feb. 1, 2024

Related U.S. Application Data

(63) Continuation of application No. 17/734,361, filed on May 2, 2022, now Pat. No. 11,783,684, which is a continuation of application No. 16/345,900, filed as application No. PCT/US2018/036797 on Jun. 10, 2018, now Pat. No. 11,322,005.

(51) Int. Cl.
*G08B 13/14* (2006.01)
*B32B 27/08* (2006.01)
*B32B 27/10* (2006.01)
*B32B 27/36* (2006.01)
(Continued)

(52) U.S. Cl.
CPC .......... *G08B 13/1454* (2013.01); *B32B 27/08* (2013.01); *B32B 27/10* (2013.01); *B32B 27/36* (2013.01); *G08B 13/126* (2013.01); *G08B 13/1463* (2013.01); *G08B 13/149* (2013.01); *G08B 13/2434* (2013.01); *B32B 2255/10* (2013.01); *B32B 2255/205* (2013.01); *B32B 2405/00* (2013.01)

(58) Field of Classification Search
CPC .............. G08B 13/1454; G08B 13/126; G08B 13/1463; G08B 13/149; G08B 13/2434; B32B 2457/00
See application file for complete search history.

(56) References Cited

U.S. PATENT DOCUMENTS 5,699,047 A * 12/1997 Tsai ...................... G08B 13/244
7,984,629 B2 * 7/2011 Xiaobin .............. E05B 73/0029
70/57.1

(Continued)

*Primary Examiner* — John A Tweel, Jr.
(74) *Attorney, Agent, or Firm* — Peter K. Trzyna

(57) ABSTRACT

A security device system including portions configured to have a combined state and a separated state. In the combined state, circuitry is configured to have an armed state and a not-armed state, and to trigger an alarm during a breach of the armed state. Depending on the embodiment, at least one of the portions, and in some embodiments more than one of the portions, participate in the armed and not-armed states. In some embodiments, the security device system includes an alarm device portion, a cradle portion, and a stratum portion.

14 Claims, 5 Drawing Sheets

(51) Int. Cl.
  *G08B 13/12*  (2006.01)
  *G08B 13/24*  (2006.01)

(56) References Cited

U.S. PATENT DOCUMENTS

| | | | | |
|---|---|---|---|---|
| 8,373,565 | B2* | 2/2013 | Yang | G08B 13/2434 |
| | | | | 340/572.1 |
| 9,169,670 | B2* | 10/2015 | Shute | E05B 73/0017 |
| 9,324,015 | B2* | 4/2016 | Wu | E05B 73/0017 |
| 10,121,340 | B2* | 11/2018 | Yang | G08B 13/2448 |
| 10,573,140 | B2* | 2/2020 | Diplock | G08B 13/1454 |
| 11,250,677 | B2* | 2/2022 | Zhang | G08B 13/1463 |
| 11,322,005 | B2* | 5/2022 | Wang | G08B 13/1454 |
| 11,783,684 | B2* | 10/2023 | Wang | G08B 13/149 |
| | | | | 340/568.2 |
| 2014/0077953 | A1* | 3/2014 | Yang | G08B 13/2434 |
| | | | | 340/572.1 |

* cited by examiner

Figure 1
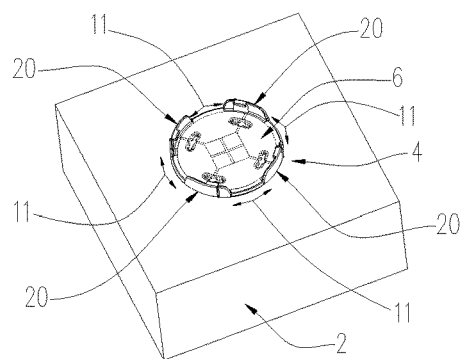
Figure 1A
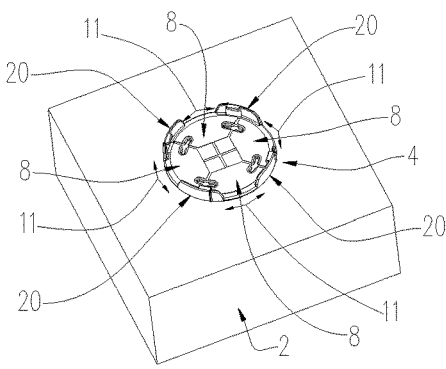
Figure 1B
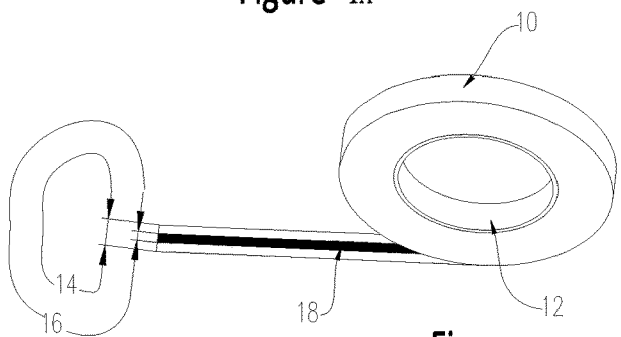
Figure 1C
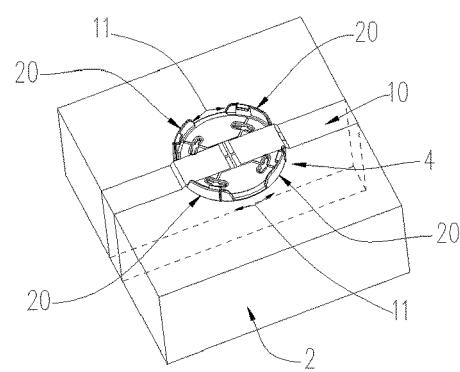
Figure 1D
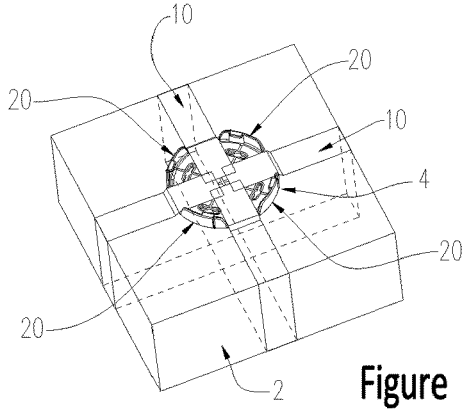
Figure 1E
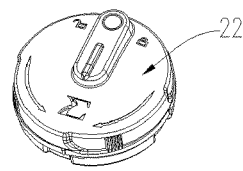
Figure 1F
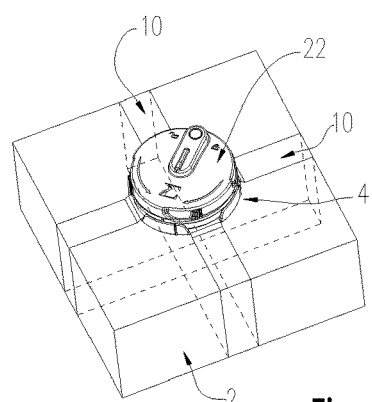
Figure 1G
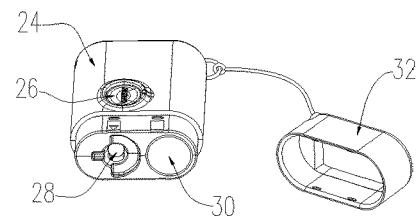
Figure 1H

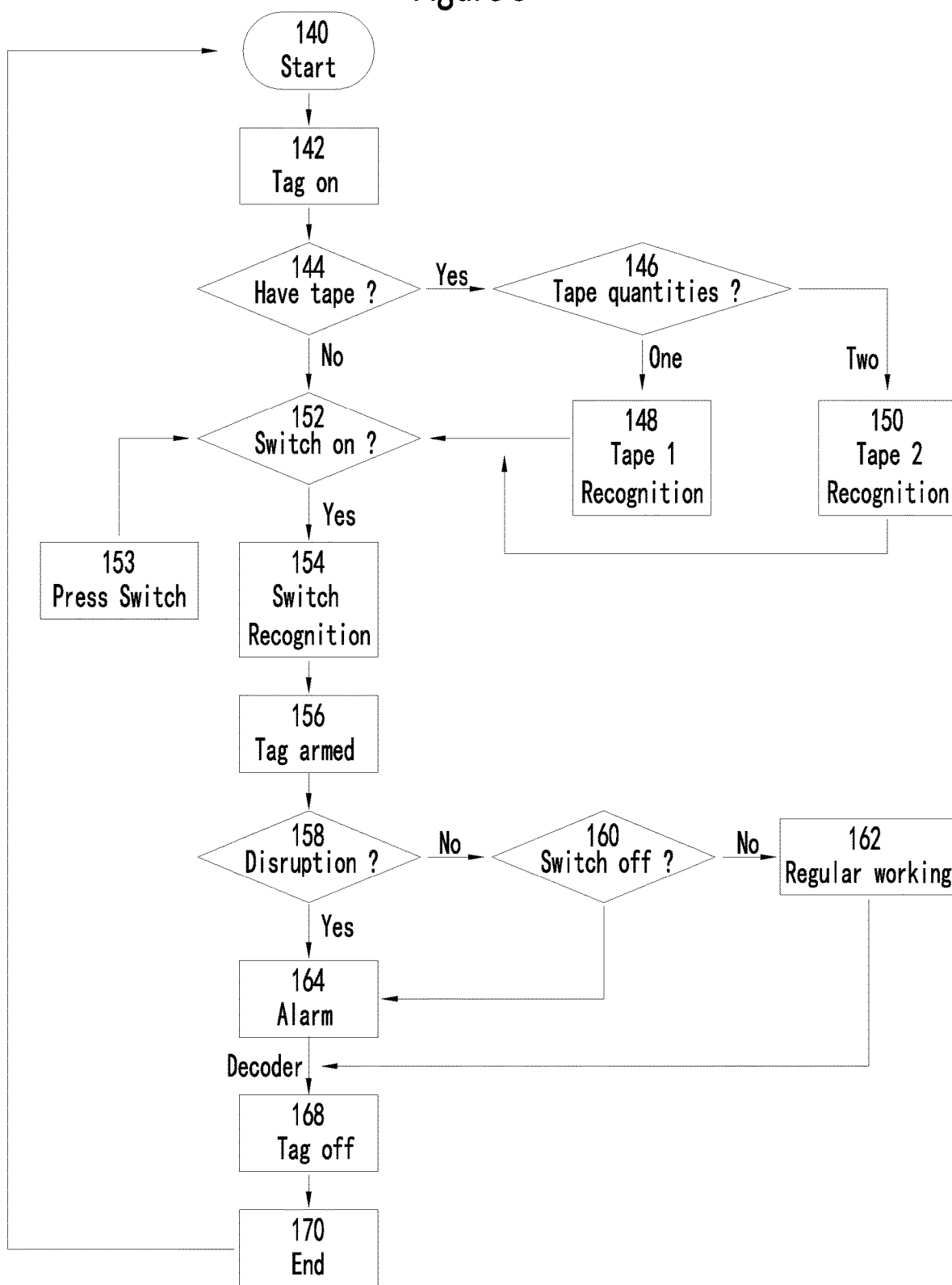

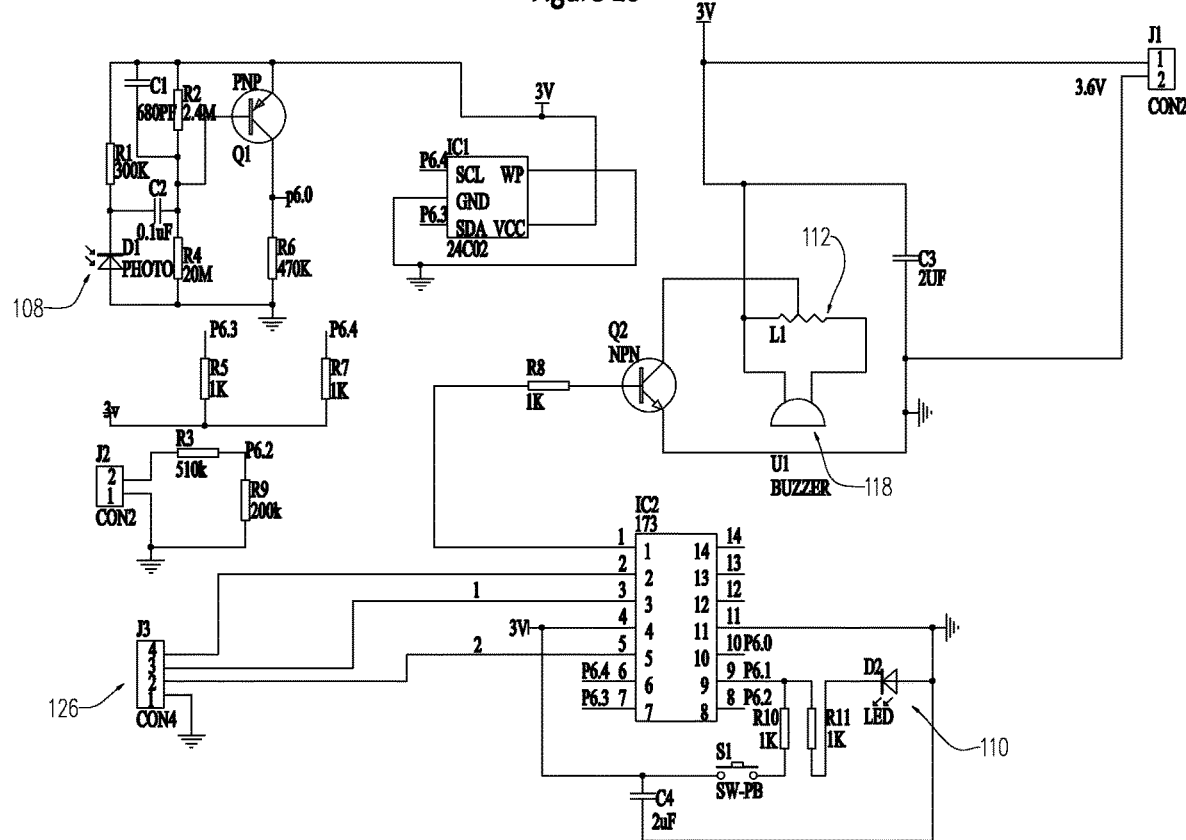

PORTIONS OF A SECURITY DEVICE SYSTEM; METHODS OF MAKING AND USING THEM

The present patent application is a continuation of and incorporates by reference completely as if restated totally herein U.S. patent application Ser. No. 17/734,361, filed May 2, 2022, pending. U.S. patent application Ser. No. 17/734,361 is a continuation of and incorporates by reference completely as if restated totally herein U.S. patent application Ser. No. 16/345,900, issued as U.S. Pat. No. 11,322,005 on May 3, 2022. U.S. patent application Ser. No. 16/345,900 is a 371 of International Application No. PCT/US18/36797, filed Jun. 10, 2018.

TECHNICAL FIELD

Articles of manufacture, apparatuses, processes for using the articles and apparatuses, processes for making the articles and apparatuses, and products produced by the process of making, along with necessary intermediates, e.g., one or more of the portions of a security device system.

TECHNICAL BACKGROUND

The technical background includes Chinese patents CN 200963017 Y, 206628044 U, 202795620 U and U.S. Pat. Nos. 9,489,808 and 9,711,032, along with PCT/US2018/029867, and PCT/US2018/12745, all of which are incorporated by reference as if fully stated herein. Yet a need exists for an alternative to such as the foregoing.

DISCLOSURE

Portions of a security device system can address the aforesaid need and/or afford such as improved versatility, functionality, and/or situational capability, depending on the embodiment that is employed. Relatedly, there can be processes of making and using the portions and/or the system as a whole.

Generally, a security device system can be configured in portions, each of the portions each having a combined state and a separated state, e.g., each portion's combined state and separated state being defined with respect to at least one other of the portion(s). The security device system can be configured so that at least one of the portions provides an armed state and a not armed-state. That is, in some embodiments, one of the portions has the armed state and the not-armed state independent of the other portions, but in other embodiments, more than one of the portions, in the combined state, participates in the armed state and the not-armed state.

In the separated state, a portion can have utility independent of another portion or portions, and thus need not participate in the armed state and the not-armed state for this utility. Similarly, in some embodiments, a combination of some, but not all, of the combined states can have utility independent of another portion or portions, and thus need not participate in the armed state and the not-armed state for this utility. In some embodiments, only one of the portions provides the armed and not-armed states, and in other embodiments, one or more of the portions participates in the armed and not-armed states.

Thus, the portions are configured for assembly into one or more combined states in which at least one of the portions provides the armed state and the not-armed state, but when not in a combined state having the armed state and the not-armed state, or when at least some of the portions are in the separate state, independent utility is afforded—i.e., at least some embodiments have multifunctional portions, depending on the embodiment of interest.

In any of such implementations, there can be a technical effect of an alternative to the prior art. In some cases, there can be improved versatility, functionality, and/or alternative or situationally-improved capabilities over conventional approaches, and in any case a technical effect even if not expressly stated as such. The disclosure herein employs a security device system as a way of teaching broader and other principles discussed below, and thus these principles are not necessarily limited to one embodiment or another discussed herein.

INDUSTRIAL APPLICABILITY

Industrial applicability is representatively directed to that of apparatuses and articles of manufacture, manufacturing the foregoing and using them, including electrical devices, security systems, alarms, tags, consumer theft-protection apparatuses, as well as substrates (in some embodiments, tape(s)) related thereto. Industrial applicability includes industries engaged in the foregoing, as well as industries operating in cooperation therewith, depending on the embodiment.

DRAWINGS

FIG. 1 is an indication of an embodiment of portions of a security device system.

FIG. 1A is an indication of an embodiment of a cradle portion of the security device system, the portion applied to an object.

FIG. 1B is an indication of an embodiment of the portion of the security device system with the object absent a protective cover from the cradle portion.

FIG. 1C is an indication of an embodiment of a stratum portion of the security device system.

FIG. 1D is an indication of an embodiment of the cradle portion and the stratum portion, with the object.

FIG. 1E is an indication of an embodiment of the cradle portion and the stratum portion and another stratum portion, with the object.

FIG. 1F is an indication of an embodiment of an alarm device portion of the security device system.

FIG. 1G is an indication of an embodiment of the cradle portion and the stratum portion and the other stratum portion and the alarm device portion of the security device system, with the object.

FIG. 1H is an indication of an embodiment representing a remote control for the security device system.

FIG. 9 is an indication of a logic flow diagram the security device system.

FIG. 10 is an indication of a circuit diagram of the alarm device portion.

MODES

Figure 2:
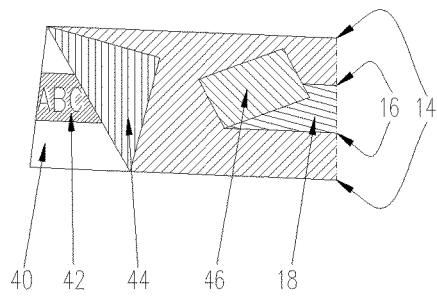
FIG. 2 is an indication of a stratum portion.

As mentioned above, the disclosure herein employs a security device (or tag) system as a way of teaching the broader principles relating to portions configured to have separated and combined states with respect to another portion or portions, e.g., a first portion is configured to have a combined state and a separated state with respect to a second of the portions; similarly, a third of the portions, if such is included in an embodiment, is configured to have the separated state and the combined state with respect to at least one of the first portion and the second portion, etc., and in some cases, the portions have separate states from more than one of the portions. Unless otherwise mentioned or apparent from the context, referring to one portion or another as the "first portion" or the "second portion" or the "third portion" or the "fourth portion" is arbitrary and not limiting.

Conceptually, there can be a first portion configured to mate with at least one other portion, e.g., be configured to connect or be connected mechanically to another portion. To illustrate the concept of being configured to connect or be connected mechanically to another portion, consider that a peg can be configured cylindrically to mate with a cylindrical void, e.g., the right diameter and depth. A gap or opening are other examples. Additionally, or in the alternative if so desired, the first portion can be configured to interlock with at least one other portion, e.g., to become interconnected together by the overlapping or otherwise fitting together of projections and recesses. To illustrate the concept of being interconnected together (engaged by overlapping or) by the fitting together of projections and recesses, consider that a bolt can be configured to screw into a nut or pieces of a jigsaw puzzle can be configured to have pieces that fit together due to projections and recesses. Yet in addition, or in the alternative if so desired, the first portion can be configured to lock together. To illustrate the concept of being locked together, consider that a deadbolt can lock a door to a door frame or a safe door can be locked to a safe with a combination lock. Still further, or in the alternative if so desired, the first portion can be configured to have an armed and an unarmed state. To illustrate the concept of an armed and a disarmed state, consider a burglar alarm that can be turned ON to detect for an unauthorized intrusion, or turned OFF while the premises are otherwise guarded. These can be implemented individually or in any combination, depending on the embodiment that is desired for one application or another. Of course, the principles and devices herein are not limited to a peg in a hole, a screw, jigsaw puzzle pieces, a deadbolt lock, a combination lock, or an armed/unarmed—these are only illustrative teachings of principles. And as indicated above, in some embodiments, forming the combined state(s) can afford functionality beyond forming the armed and not-armed states, as elaborated below.

Now consider these concepts in an application toward the teaching example of a security device. A first portion of the security system, say an alarm device, can be configured to mate with another portion of the security device, e.g., mechanically, electrically, magnetically, etc. For example, consider that the first portion can be configured to have a plug-in or peg-like section that coincides with a cylindrical void-like section of another portion, say, a cradle portion. For example, the peg-like section can have a diameter and, if desired, a depth that fits into a cylindrical void-like section or extensions of the other portion. Another approach can be to have at least one tab on one portion extend into a corresponding slot on another portion. In any such case, the portions can be mechanically mated into a combined state.

If so desired, though not always necessary, these portions can be configured to interlock, e.g., screw together. For illustrative purposes, after one portion is mated to another portion, the portions can be screwed together to interlock.

And if so desired, the portions can be configured to lock together, e.g., by a pin that must be moved to unlock the portions from each other. Note that the portions need not always first mate nor interlock, e.g., two flat surfaces can be locked together, such as by a magnetic lock.

And if so desired, the portions can be configured to be in the combined state with a third and/or more portions. For example, a third portion can be a stratum, such as a conductive stripe as may be located on a tape. The stratum portion can be mutually structured with either or both of the above illustrated portions mate, interlock, and/or interlock.

And any of the foregoing portion(s) can be configured with alarm circuitry, such as that which detects a breach of an armed state, such as by detecting for an electrical change in the circuitry, e.g., occasioned by a broken circuit, tripped switch, etc. Indeed, if so desired for example, when the portions are in the combined state to cooperate, alarm circuitry can be configured to span the other portions, detecting for a breach of the armed state occurring in the portions, so as to trigger an alarm during a breach of the armed state.

The manner of combining any the foregoing state can in some cases provide additional functionality. For example, in the combined state, in some embodiments, the first portion can be combined with the second portion so as to block access in a functional way. For example, consider portions that, when combined, block access to one of the portion's compartment for battery replacement, thereby allowing access to the battery compartment to be secured during the locked, interlocked, and/or armed state.

Consider now the application of the foregoing concepts applied to portions configured to have a separated state, e.g., a state in which one portion is separated from another portion or portions but configured to mate, etc. into the combined state. In this separated state, the portions can be in an un-interlocked or a re-interlockable un-interlocked condition with respect to another portion or portions. If so desired, in this separated state, the portions can be in an unlocked or a relockable unlocked condition with respect to each other portion or portions. In some but not all embodiments, at least one of the portions can be operationally functional on its own, yet provide additional, alternative, or optional functionality in the combined state.

Depending on the embodiment preferred for one application or another, illustrative teaching examples are provided below.

FIGS. 1A, 1B, 1D, 1E, and 1G illustrate articles of manufacture and apparatuses as well as process steps. FIGS. 1A, 1B, 1D, 1E, and 1G illustrate an object 2, such as an object to be protected, e.g., from consumer or employee theft. The object 2 is illustrated as a box or package, but object 2 is not limited to such.

As is also illustrated in FIGS. 1A, 1B, 1D, 1E, and 1G, there is cradle portion 4. Cradle portion 4 is illustrated herein as a cradle, but it too need not be so limited. Cradle portion 4 can in some, but not all, embodiments be another type of receiver for an alarm device, stratum (tape, multiple tapes, or any combination of them, strata, etc.)

FIG. 1A illustrates the cradle portion 4 applied to the object 2, e.g., positioned with respect to the object 2 appropriate for the embodiment. For example, cradle portion 4 can be adhered to the object 2, e.g., by an adhesive or adhesive pad (not shown in FIG. 1A), so that the cradle portion 4 can be adhered, as in this illustration, centered to a plane of the object 2 with the adhesive intermediate the cradle portion 4 and the object 2. Mechanical connecting of the cradle portion 4 to the object 2 is another of the approaches that can be used. Cradle portion 4 is structured for a combined state with one or more of the portions, that are structured for a combined state with the cradle portion 4, as discussed below. In FIG. 1A, the cradle portion 4 has a cover sheet 6, but this is optional, i.e., some embodiments do not employ a cover 6. The cover sheet 6 may be useful in, say, protecting some of the cradle portion 4 during its manufacturing or otherwise prior to its employment in a security device system. Illustratively, too, cradle portion 4 can have a receiving area, herein exemplified with extensions 20 defining therebetween gaps 11, cooperating with one or more other portions as discussed below.

FIG. 1B illustrates the cradle portion 4 with the cover 6 removed (or illustrates the case where an embodiment does not include cover 6), revealing at least one electrical conductor 8 (e.g., aluminum foil), in some embodiments revealing at least two electrical conductors 8, and in other embodiments more than two electrical conductors 8, such as the four electrical conductors 8 depicted in FIG. 1B. The conductors 8 may, but need not always, be identical. Where more than one of electrical conductor 8 is employed, the conductors 8 may in some cases be electrically separated conductors 8.

FIG. 1C illustrates a stratum portion 10 on a roll 12. The stratum portion 10 can, but need not always, be a tape (e.g., could be a twine, wire, paint, printing, etc., depending on the embodiment of interest). The stratum portion 10 can be configured for the combined state in the security device system. For example, the stratum portion 10 can comprise a tape having an external width dimension 14, an inner width dimension 16, e.g., for a stripe 18 adjacent an edge, or intermediate edges, of the external width dimension 14. In some embodiments, stripe 18 can have a characteristic that cooperates with the security device system, such as a conductive characteristic. A code on the stripe 18 is another approach, if the security device system employs an optic reader, etc.; at issue is cooperablitity with the security device system.

FIG. 1D illustrates the stratum portion 10 applied to the object 2 and connecting (as illustrated) two of the electrical conductors 8. Depending on the implementation of interest, the stratum portion 10 can be applied starting within the cradle 4 portion and ending within the cradle 4 portion, though in some embodiments, the stratum portion 10 can end shorter or can overlap itself, and/or extend beyond a singular latitudinal wrap of the cradle portion 4. Note that in FIG. 1D, the stratum portion 10 has at least partially filled two of the gaps 11 shown in comparison in FIGS. 1A and 1B. In this sense, the stratum portion 10 is mated with the cradle portion 4.

FIG. 1E illustrates an embodiment having two stratum portions 10 applied to the object 2 and connecting (as illustrated) four of the electrical conductors 8, etc. in the same manner as discussed with regard to FIG. 1D. Note that in FIGS. 1D and 1E, the cradle portion 4 and the stratum portion(s) 10 are mutually structured to enable them to form a combined state, as in the stratum portion(s) 10 at least partially filled two of the gaps 11 shown in comparison in FIGS. 1A and 1B, i.e., these portions are mated. While it should be apparent guided by the teaching herein that there are many ways to mutually configure portions to form a combined state, FIGS. 1D and 1E illustrate that the stripe 18 is structured to locate aligned with the conductors 8 while positioned through the gap(s).

FIG. 1F illustrates an alarm device portion 22, which includes circuitry having an armed state and a not-armed state. When in the armed state, the circuitry is configured to detect whether there is an electrical change in the circuitry, e.g., occasioned by a broken circuit, tripped switch, etc. In some embodiments, alarm device portion 22 can be a solo functioning device (operable as an alarm device, with armed and not-armed states devoid of other portions, yet configured for a combined state with one or more of the portions). Alternatively, alarm device portion 22 shares mutual structuring for a combined state and the armed and not-armed states, with at least one of the other portions, e.g., cradle portion 6 and/or the stratum portion(s) 10. For example, the alarm device portion 22 can include the cradle portion 4 and/or the stratum portion(s) 10 in the circuitry, such that a disruption in an electrical signal in the circuitry triggers an alarm.

FIG. 1G illustrates the alarm device portion 22 in a combined state with the cradle portion 4 and two stratum portions 10. Thus, the stratum portion 10 with the alarm device portion 22 and cradle portion 4 are arranged as in a "gift wrap" or "spider wrap" formation, though of course this is not required of all formations-see, e.g., FIG. 4 and FIG. 5. Note that some embodiments herein are devoid of a spool of wire(s), conventional in spider wrap systems; some embodiments are devoid of an antitheft tack or pin; and some embodiments are devoid of an antitheft lanyard. See, for comparison, U.S. Pat. Nos. 9,489,808 and 9,711,032, along with PCT/US2018/029867, and PCT/US2018/12745.

In FIG. 1H, remote control 24 brings engages a not-armed state. In some embodiments, remote control 24 engages an armed state. While many approaches can be employed for ON/OFF/STANDBY functionality, one of the many approaches is to use a remote control 24 having a switch 26 that triggers a broadcaster 28 signal and/or a magnet 30, such as for unlocking the alarm device portion 22 from the cradle portion 6, the stratum portion(s) 10, or both. Remote control 24 can have a cover 32 to shield the magnetic field emanated by magnet 30 and obstruct the broadcaster signal 28, for example, to avoid unintentional disarming/unlocking of the alarm device portion 10. Details of various remote controls can be found in U.S. Pat. Nos. 9,489,808 and 9,711,032, along with PCT/US2018/029867, and PCT/US2018/12745, all of which are incorporated by reference. In some embodiments, there need not be an OFF condition. Once the armed state exists, the remote control 24 can be operable to turn the armed state of security device system to a STANDBY mode, but such depends on the implementation of interest. In some embodiments, remote control 24 can also be operable in whole or part to turn the alarm device system ON and/or into an activated mode. Such IR remote controls as can be used in remote control 24 are used in television and cable box switching, and suppliers include Sharp™, LG™, Samsung™ and Comcast™, and ATT™ digital. The remote control 24 illustrated in FIG. 1H accommodates battery replacement that can be the same kind of battery that powers the alarm device portion 10, as discussed below. Button 26 initiates the broadcast signal, and for efficiency, the same magnetic field can also be used to unlock a lock connecting the cradle portion 4 and the alarm device 10, if that embodiment is desired. A dual approach to unlocking, e.g., using a coded broadcast and a magnetic field, enables secure possession by only an individual authorized to unlock the portions.

Turn now to FIG. 2 which illustrates one of the many ways that stratum portion 10 can be composed. The stratum portion 10 can (but need not always) be a tape, e.g., having five layers, as illustrated in FIG. 2. A first layer 40 can be a thermoplastic polymer resin of the polyester family, such as polyethylene terephthalate. A second layer 42 can be a printing layer, for example, providing one or more prompt messages, a logo, both, etc. A third layer 44 can be an adhesive layer, and a fourth layer 46 can be another layer of a thermoplastic polymer resin of the polyester family, such as polyethylene terephthalate. Conductive stripe 18 can be the fifth layer. The conductive stripe 18 can be a metal, such as aluminum, silver, or the like, and can be formed by a metal deposition technique such as vacuum metalizing, conductive paint, conductive ink, a metal strip adhered to the adhesive layer 46, etc. In a configuration as illustrated in FIG. 2, third layer 44 is wider than fifth layer, conductive stripe 18, so that the adhesive of the third layer 44 can adhere the stratum portion 10 to object 2, e.g., with the conductive stripe 18 intermediate the adhesive layer 44. Having the conductive stratum portion with a conductive stripe 18 on one side of stratum portion 10 and an electrical insulator on an opposite side of stratum portion 10, if so desired, allows the stratum portion 10 to overlap without causing an electrical connection, e.g., a short. Such a tape can be wound around the roll 12 in multiple layers to produce an exterior dimension that is not co-cylindrical with the roll 12. That is, the tape embodiment, having an adhesive side and an electrically insulating side, is wound to produce multiple layers on the roll 12. The conductive stripe 18 on an adhesive side of the tape, running along the length of the tape, parallel to edges of the width 14 but not as wide as the width 14, forms a circumferentially thicker region in the adhesive tape and where the conductive stripe 18 trapped in the windings on the roll 12.

Illustratively, the external width dimension 14 of the stratum portion 10 can be in the range of 15 mm+0.5 mm, say, .05 mm, with a thickness in the range of 0.05 mm+0.005. The inner width dimension 16 of the fifth layer 18 conductive stripe can be in the range of 5 mm+0.25 mm, with a thickness in the range of 0.0055 mm+0.0002. The thickness of aluminum or silver particles (e.g., produced in metalizing) can be in the range of 0.0005 mm+0.00005 mm, and the resistance of the conductive stripe of layer 48 can be in the range of ≤ 250 Ohm/m. Ductility of the stratum portion 10 can be in the range of $1 with a tensile strength of the stratum portion 10 in the range of ≥3.5K.

Figure 3:
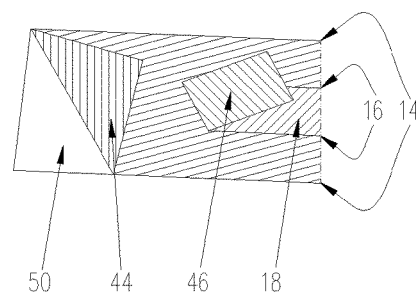
FIG. 3 is an indication of a stratum portion.

As mentioned above, stratum portion 10 can be composed differently than as mentioned with respect to FIG. 2. For example, the stratum portion 10 can be printed or painted directly on object 2. Alternatively, as exemplified in FIG. 3, a tape embodiment can have a different number of layers. For example, instead of the first layer 40 and the second layer 42 in FIG. 2, FIG. 3 uses a fragile paper 50. The fragile paper 50 can be "destructible paper" (including ultra destructible paper) or a thin poly film, and can in some cases have partial tears to dispose the fragile paper 50 to destruction upon removal from object 2. Located adjacent the fragile paper 50 is the third layer 44 and then the fourth layer 46 and then the fifth layer 18. With this construction, when the stratum portion 10 is removed from an object 2, at least some of the stratum portion 10 is comparatively more readily destroyed when removed. Having the conductive stripe 18 be more readily destructible upon removal or tampering provides another manner of protection afforded by the security device system.

Yet another aspect of some embodiments of the stratum portion 10 is the use of color. Color(s) can be provided by ink printing on the second layer 42 or embedded in plastic of another of the layers, or in/on the paper 50, etc. Colors can be used, for example, in distinguishing different types of the stratum portion 10, e.g., when issued from a tape dispenser having more than one of the types of the stratum portion 10, e.g., different widths 14 to go with different cradle portions 4 and/or different alarm device portions 22. Color can also be used in distinguishing different shapes of conductive stripe 18 of the stratum portion 10 or other circuitry configurations of the stratum portion 10.

Figure 4:
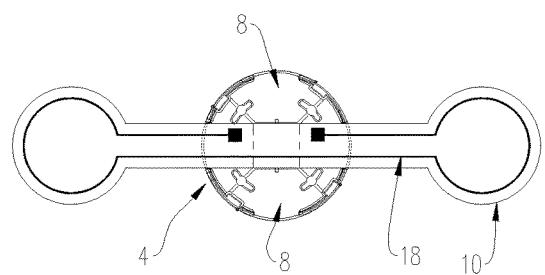
FIG. 4 is an indication of another stratum portion with the cradle portion.
Figure 5:
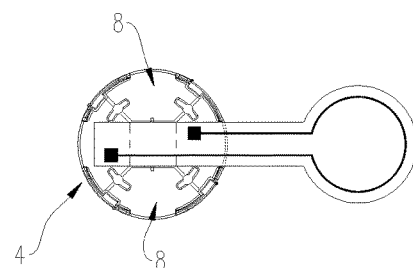
FIG. 5 is an indication of a yet another stratum portion with the cradle portion.

FIGS. 4 and 5 illustrate other embodiments of the stratum portion 10, such as those with a return electrical path to one side of cradle portion 4 or with at least one preformed planar curvilinearity in conductive stripe 18. Such embodiments have utility in wrapping irregular objects 2, or partially wrapping objects 2, such as those with structures difficult or undesirable to encircle. Tape embodiments, such as the five-layer and the three-layer embodiments discussed above, can implement the different conductive stripe 18 formations in FIGS. 4 and 5 as well as that of FIG. 1. Indeed, there can be any combination of different stratum portions 10, with extensions 20 of cradle portion 4 accommodating the variously structured stratum portions 10. For example, embodiments with four conductors 8 can have four extensions 4 have four gaps 11. Illustratively, the gaps 11 can correspond to the sizing of the stratum portions 10, the conductors 8 can correspond to location of the conductive stripes 18, etc. The range of these teaching examples is to convey that many configurations are possible within the scope of the principles disclosed herein.

Figure 6:
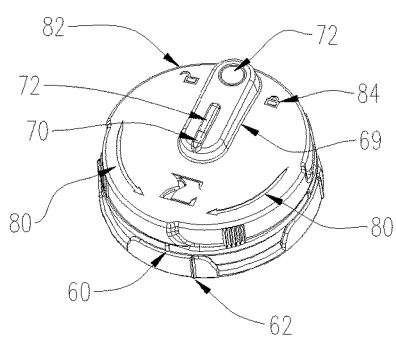
FIG. 6 is a top perspective view of the alarm device portion in a combined state with the cradle portion.
Figure 7:
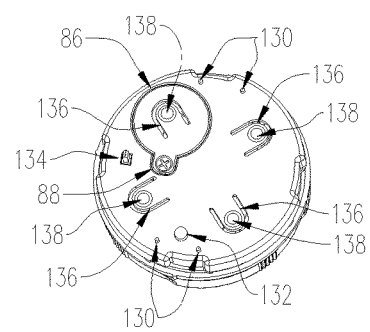
FIG. 7 is a bottom view of the bottom of the alarm device portion.

Turn now to FIG. 6 and FIG. 7 which illustrate further teaching applications of these principles involving the portions. FIG. 6 and FIG. 7, like the others, are not limiting and are illustrative to teach broader principles. In FIGS. 6 and 7, the alarm device portion 10 can have a top (see FIG. 6 for a perspective view; 52 in FIG. 8) and a bottom (see FIG. 7 for a perspective view; 54 in FIG. 8). Like cradle portion 4, the top 52 and bottom 54 can be molded or 3D printed. The plastic used in the molding can be acrylonitrile butadiene styrene or another thermoplastic and amorphous polymer.

If so desired, alarm device portion 22 can have a marker 60 and the cradle portion can have a marker 62. Markers 60 and 62 indicate an alignment, e.g., initial alignment, of the alarm device portion 22 and the cradle portion 4, such as for mating them. In this position, rim 66 fits within extensions 20, when the alarm device portion 22 and the cradle portion 4 are mated together. Imparting the rotational motion with respect to the alarm device portion 22 and the cradle portion 4, rotates the marker 60 from initial alignment with the marker 62 into an unaligned location. Entrance 64 on bottom 54 allows a lip 66 to enter and engage into slot 68 via the imparted rotation, allowing the alarm device portion 22 and the cradle portion 4 to be in the interlocked condition. Contrastingly, by reversing the imparted rotation, alarm device portion 22 and the cradle portion 4 are uninterlocked, and by separating the mated alarm device portion 22 and the cradle portion 4, they are unmated.

Figure 8:
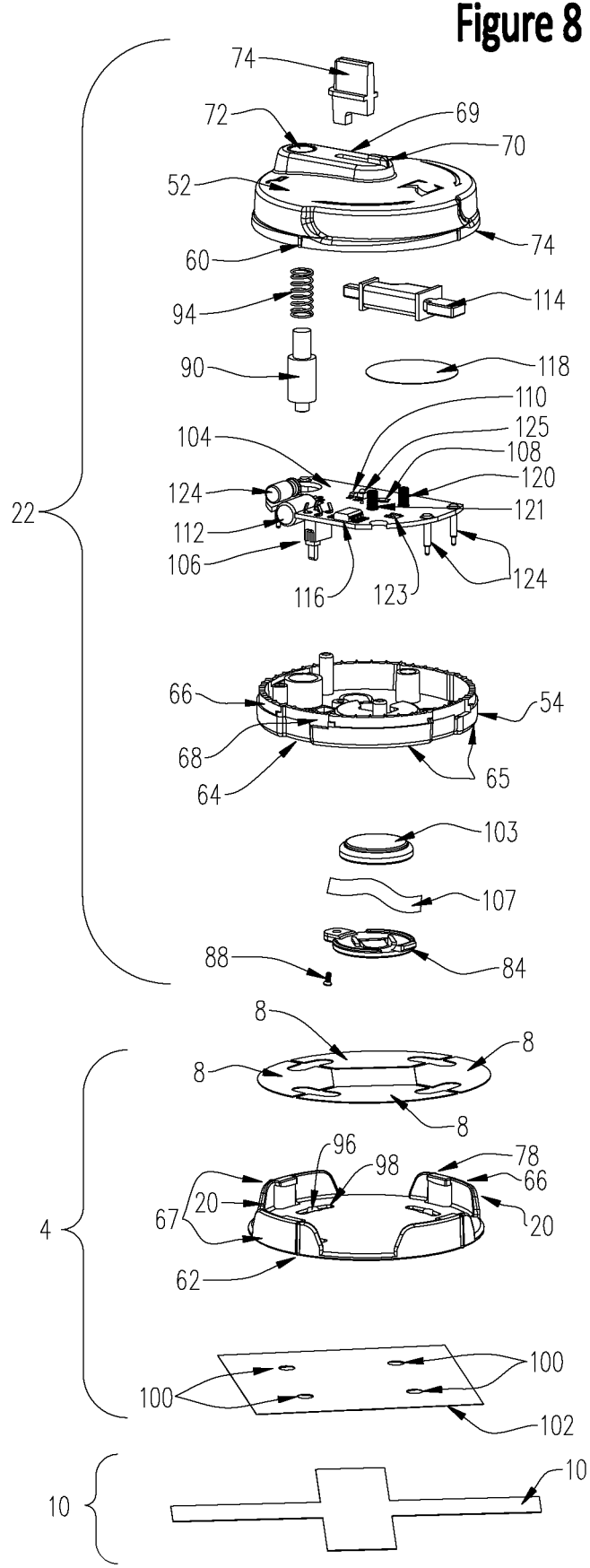
FIG. 8 is an indication of a top view of some components of the alarm device portion.

While many forms of mating can be employed where desired, as illustrated in FIGS. 6 and 7, various portions can be mated by either a male and female intersection or both. Illustratively, FIG. 8 depicts the alarm device portion 22 configured to mate with the cradle portion 4 by inserting a male section of the alarm device portion 22 into a female section of the cradle portion 4 and by inserting a male section on the cradle portion 4 into a female section of the alarm device portion 22. For example, the alarm device portion 22 can have at least one entrance 64 (female section) to engage at least one lip 66 (male section) of the cradle portion 4. Entrance 64 and lip 66 can mate so that the portions 4 and 22 can subsequently screw-interlock together via the previously described the rotational motion. Entrance 64 can allow lip 66 to be inserted into a portion of entrance 64 by a linear motion, and then allow the rotational motion to interlock the portions 4 and 22 via a slotted region 68 that engages lip 66 in the screw-interlocked condition.

Similarly, for example, the alarm device portion 22 can have a generally circular rim 64 (male portion) having a diameter less than the diameter of curved or a ring-like configurations 67 on extensions 20 on the cradle portion 4, such that some of the alarm device portion 22 fits within the curved or ring-like configurations 67 (female portion) of extensions 22. The ring-like configurations need not be rings, e.g., can otherwise facilitate mating by male and/or female intersecting, if that manner is preferred in the embodiment of interest. Additionally, please note that the male/female intersecting can be carried out with either section providing the male structure, and the other section providing the female structure.

The alarm device portion 22 can, if so desired, have a lip-like structure 76 that aligns with another ring-like structure 78 of the cradle portion 4, to provide stability during the aforesaid rotation. Likewise, the ring-like structures 78 need not be rings to facilitate stability, if stability during the rotation is desired in the embodiment of interest.

Returning to FIG. 6, if so desired in one design or another, the alarm device portion 22 can include counter-directional indicators of rotational motion. For example, there can be counter directional arrows 80 with or without such as a lock marker 82 and unlock marker 84, collectively indicating rotational directions for interlocking (and locking) and un-interlocking (and unlocking) portions 4 and 22.

At the top 52, a remote control receptor 69 is configured to mate with the remote control 24. Where a magnetic and broadcast unlocking system is employed, receptor 68 can have a broadcast receptor location 70 for receiving a broadcast signal from the remote control 24 and a magnetic field receptor location 72 for receiving a magnetic field from the remote control 24. More specifically, the alarm device portion 22 includes a three-dimensional remote control locator 69 structured such that if a remote control 24 includes a mating three-dimensional locator (not shown in FIG. 7), then the alarm device portion 22 and the remote control 24 are oriented to mate together, and if the remote control 24 does not include the mating three-dimensional locator, then the alarm device portion 22 and the remote control 24 are disoriented from mating together. This feature can be implemented with, or instead of, having a distance on the alarm device portion 22 between the magnetic field locator 72 and the broadcast reception locator 70, the distance matching a distance on the remote control 24 between a magnetic 30 and a broadcast transmitter 28 (FIG. 1H). Remote control receptor 69 can be configured to mate with the remote control 24, and not mate with differently-structured remote controls. Compare with the receptor in PCT/US2018/29867, incorporated by reference. Alternatively, different alarm devices can be structured with identical receptors so that one remote control 24 can match more than one type of alarm device, such as that herein and that in PCT/US2018/29867, and/or other alarm devices incorporated by reference herein.

On one end of the alarm device 10's top 52 can be a light guide 74, which as discussed below, can indicate an armed state or other information, as discussed below. On an opposite end, at the alarm device 10's bottom 54 can be a replaceable battery compartment, under door 86, which is secured by screw 88. Intermediate the top 52 and bottom 54, there can be a magnetic lock pin 90 in abutment with spring 94, located to dispose the magnetic lock pin 90 away from top 52 so as to protrude from bottom 54. Cradle portion 4 has an opening 96 within a slot 98 to receive the protruding portion of the magnetic lock pin 90, and thereby lock the alarm portion 22 with the cradle portion 4. The slot 98 allows the aforesaid rotational motion, and can also help align the protruding portion of the magnetic lock pin 90 with the opening 96. Openings 96 align with openings 100 in adhesive pad 102. (Adhesive pad 102 or sticker can have a tabbed cover that is removed to expose an adhesive face which can be employed to adhere the cradle portion 2 to the object 2, and such an adhesive pad 103 can be obtained from 3M™.) While the magnetic lock pin 90 extends into one of the openings 96, the combined state with a locked condition prohibits unscrewing (un-interlocking) engagement of slotted region 65 that engages lip 66. Magnetic lock pin 90 is withdrawn from the opening 96 by urging from the magnet 30 portion of remote control 24. Thusly, the magnetic lock pin 90 is extendable from the alarm device portion 22 into an opening 96 in (or a receptor on) the cradle portion 4, e.g., below a bottom 54 of the alarm device portion 22, and into an indentation such as an opening 96 to be lockable and unlockable to relock.

Also intermediate the top 52 and a bottom 54 is at least some circuitry that can, but need not, comprise circuitry on a printed circuit board (PCB) 104, e.g., a PCB having elements on both sides. The circuitry comprising the PCB 104 used in the armed state can be powered by a battery 103, e.g., a replaceable battery, or other power means in other embodiments. For example, the battery 103 can be a 1632 battery. If so desired, the battery 103 can be the same type as the battery used in remote control 24. Springs 120 and 121 can communicate electricity from battery 103 to the circuitry of PCB 104. Battery door 86 can be secured to the bottom 54 by such as a self-tapping screw 88, as mentioned above. Battery 103 can communicate with a diode (see FIG. 10) to sturdy the voltage from battery 103 in the circuitry.

Upon the PCB 104 can be a microswitch 106, operable by a spring-loaded plunger to have an extended position and a retracted position. The extended position can reach farther outwards from printed circuit board 104 than in the retracted position, and when armed, the PCB 104 can respond to a change in the extended position as a breach of the armed state. Thus, for example, if portions 4 and 22 are separated while the device 3 is armed, microswitch 106 will trigger an alarm, discussed below. Thusly, a breach can recognized during the armed condition from a position of a switch (e.g., microswitch 106) located to detect separation of the alarm device portion 22 and the cradle portion 4 (and in some cases, from object 2).

In some embodiments, only two switches are needed. A plastic tab 107 on the battery 103 can be pulled through a slight opening between the battery compartment door 86 and the top 52 (or removed otherwise) to initially turn the alarm device portion 10 ON. The remote control 24 can be used to place the alarm device portion 10 in a STANDBY or ON (armed) OFF (not armed) condition. Though again, some embodiments can leave the alarm device portion ON or in STANDBY mode and not utilize an OFF mode. Therefore, some embodiments need have only two switches in the security device system, that being represented by the microswitch 106 and the broadcast receiver switch 108, e.g., controllable by the remote control 24. But if so desired (not shown in FIG. 8) there can be an RF antenna and RF receiver cooperating with the circuitry.

Microswitch 106 can be used, in some embodiments, to detect for separation of the cradle portion 4 and the alarm portion 22, and in other embodiments such as where the alarm device portion 22 is adapted as a solo functioning alarm device, the microswitch 106 can detect for separation of the alarm device portion 22 from object 2, with the aforesaid magnetic lock pin 90 retracted and not engaged with another portion.

As previously mentioned, there can be the broadcast receiver switch 108 (e.g., an infrared receiver, signal collector, or receiver operable to receive whatever broadcast signal is emitted by remote control 24, to turn the circuitry to an ON and/or OFF and/or a STANDBY mode). Remote control 24 can, for a teaching example, broadcast an infrared code to which the receiver/switch 108 receptive for controlling its switching. If so desired, the circuitry of PCB 104 can use an indicator light 110 (e.g., an LED) that can display illumination via the light guide 74. If so desired, light 110 can illuminate periodically, when the power is ON or to communicate messages as discussed below.

Also on the PCB 104 is an inductance device 112. Such devices are commonly available and sometimes known as an "audio push switch adapter." An audio push switch adapter has two different-diameter copper coils and a magnetic bar/ferrite rod 114. These cooperate so that when a control chip 116 (discussed below) sends out a small, pulsing signal, the inductance device 112 transfers the small signal from the control chip 116 into a large signal which drives an alarm 118, e.g., a buzzer wafer, also known as a piezoelectric wafer (e.g., 20 mm), which then produces an alarm sound. Other alarms can be used, e.g., a bell, light, broadcast, indicator, etc. Springs 120 and 121 enhance vibration of alarm 118, while spring 121 and spring 120 connect springably to the battery 103.

The circuitry of PCB 104 can include the aforesaid control chip 116, which can be a small IC control chip. Chip logic can be hard wired or implemented with a CPU (e.g., for a computer) and programmable logic or a combination thereof. The chip 116 can be a HS173NS08-J (available from Shenzhen Bofutong Technology Co., ltd.) or the like. Program logic can, but need not, be such as in FIG. 9.

Returning to FIG. 8, PCB 104 also has a capacitance device 124, for electricity storage. Conductive probes 126, such as copper thimbles, extend (sometimes springably) from PCB 104. The conductive probes 126 also extend the electrical reach of the PCB 104 through the bottom 54 to encounter the conductors 8 on cradle portion 4, or in some embodiments, to the stratum portion 10. In some embodiments, conductive probes 126 can extend through slots 98. There can be, for example, two or four or more sets of probes 126. While stratum portion 10 can be secured to cradle portion 4 as further discussed below, in other embodiments, e.g., where the stratum portion 10 is painted or printed on object 2, the conductive probes 126 can extend through the cradle portion 4 and the adhesive pad 102. In other cases, the stratum portion 10 can be configured for location intermediate the adhesive pad 102 and the cradle portion 4.

Consider now FIG. 7, an example of the underside of alarm portion 10. There can be at least one portal 130 per conductive probe 126, located for electrical conductive communication to conductors 8, in this teaching example. Opening 132 allows magnetic pin 90 to extend through bottom 54. Another opening 134 can be provided for the extension of microswitch 106 through bottom 54.

Paddles 136 are partially opened in bottom 54, configured like diving boards. Paddles 136 are partially opened in bottom 54 springably bias compression stalks 138. This is one manner of compressing stratum portion 10 toward conductors 8 in the mated condition. In some embodiments, cradle portion 4 can have receptors for the stalks 138, thereby securing (e.g., interlocking or locking-depending on the embodiment) the alarm device portion 22 and the cradle portion 4 and the stratum portion(s) 10. Accordingly, PCB 104 circuitry can extend along one of the probes 126 to one of conductors 8 exposed to the conductive stripe 18 that is compressed (and in some embodiments, interlocked and/or locked) with cradle portion 4. The circuitry then continues through the stratum portion 18 to another of the conductors 8 in compressed (or in some embodiments also interlocked and/or locked) together. The circuitry then continues up another of the probes 126 and back to the PCB 104. Because stratum portion 10 can have an insulating face opposite object 2, more than one stratum portion 10 can overlap, as illustrated in the configuration of FIG. 1G without electrical shorting. The embodiments in FIG. 4 and FIG. 5 can use two of conductors 8 and one set of two probes 126, whereas embodiments as in FIG. 1G can use four of conductors 8 and two sets of probes arms 126.

A number of configurations are possible for surface mounting cradle portion 4, with or without adhesive pad 102 that can be adhered to cradle portion 2. Adhesive sticker 124 can have a tabbed cover that is removed to expose an adhesive face which can be employed to adhere the second portion a surface. A central opening in the sticker 124 allows pin 122 to reach the surface to which the adhesive is attached.

Alternatively, or in addition, one or more openings can be provided through cradle portion 4 to more fixedly attach the cradle portion 4 than by just relying only on adhesive means. Thus, another configuration for surface mounting cradle portion 4 includes at least one screw, herein illustrated as two tapping screws 126. Tapping screws 126 are locatable into holes 128 which have a decreased diameter at 130 adjacent bottom cover 108 to allow each head tapping screws 126 to bind cradle portion 4 to a surface.

Turn now to FIG. 9 for a teaching of one of the many ways to employ logic, e.g., in chip 116, to involve the alarm device portion 22, the cradle portion 4, and the stratum portion 10 in the armed and not-armed states. Commence with Start 140, for example, by removing a battery protective tab 107 from battery 103 to expose one of the poles of the battery 103 to the circuitry. Otherwise, remote control 24 can be employed to engage the armed state of the alarm device portion 10, at Start 140. A test at Tag On 142 detects for the presence of cradle portion 4. A test at Have Tape 144 detects for the presence of a stratum portion 10. If there is a stratum portion 10 detected at Have Tape 144, test in Tape Quantities 146 detects for the quantity of stratum portions 10. If only one stratum portion 10 is detected at Tape Quantities 146, there can be a recognition of there being only one stratum portion 10 at Tape One Recognition 148, e.g., by issuing a singular alarm burst via alarm 118. Alternatively, or additionally, there can be a burst at light 110. The combination of audio and visual signals is particularly appropriate for informing those with one of an acoustic or visual disability.

If only two stratum portions 10 are detected at Tape Quantities 146, there can be a recognition of there being only two stratum portions 10 at Tape Two Recognition 150, e.g., by issuing a two alarm bursts via alarm 118 (etc., for more stratum portions 10), and/or illumination bursts via light 110. If no stratum portion 10 is detected in Have Tape 144, or if one or more tapes are detected, as in Tape One Recognition 148 and Tape Two Recognition 150, a test Switch On 152 detects whether the microswitch 106 is ON. If microswitch 106 is detected at Switch On 152 as ON, there can be a recognition at Switch Recognition 154, e.g., by issuing a series of alarm bursts via alarm 118, and/or illuminations via light 110. However, if the microswitch 106 is not ON, then do not engage the armed state unless Press Switch 153.

A test at Disruption 158 detects for a disruption in an electric signal communicated along the portion(s) involved in the armed state at Tag Armed 156. Disruption 158 can be a test for whether one or more of stratum portion 10 is broken or altered (e.g., surge in resistance or conductivity). If not, or if there is no stratum portion 10, Switch Off 160 tests whether the microswitch 106 is triggered, e.g., the microswitch 106 is extended. If microswitch 106 is not triggered, then regular working condition is maintained at Regular Working 162, with respect to whatever of the portion(s) are participating in the armed state. If the signal in one or more of stratum portion 10 is broken or altered (e.g., surge in resistance or conductivity), as determined at Disruption 158, or if the microswitch 106 is triggered as determined at Switch Off 160, then the Alarm 164 triggers the alarm 118 and/or the light 110 as a breach of the armed state. Application of remote control 24 changes to the not-armed state in Tag Off 168. This allows disassembly of the portions without triggering the alarm 118, etc. At End 170, there can be an END, such as a SUSPEND MODE or OFF. Depending on the context, negative logic, i.e., testing for ON instead of OFF, power rather than no power, etc., can also be employed, and analog, digital, or a combination thereof are suitable for implementations consistent with the teachings herein. In some embodiments, the alarm device will engage the armed state with any of a strata portion 10 (or portions 10) and the cradle portion 4, or in solo-functioning alarm device portion 10 embodiments, engage the armed state with none of the strata portion 10 and the cradle portion 4. Thus, different logic can be employed for different embodiments.

Turn now to an illustrative circuit diagram in FIG. 10, which again is a teaching example as other circuitry and thus diagrams can be implemented for the embodiment of interest. Attention is respectfully drawn to the location of probes 126, receiver 108, inductance 112, buzzer 118, and light 110. While discussions herein mention resistance, conductivity can of course be used (i.e., resistance is the reciprocal of conductivity).

In operation, there can be a process of detecting, by alarm device system, a change from the armed state to the unarmed state. Change such as a change in resistance, a short circuit, a surge, etc., are types of changes in state that can be detected. The process can also include making one or more of the portions, and products produced thereby, as well as assembling the portions into the security device system.

With the foregoing teaching illustrations in mind, embodiments may include: any of a cradle portion 4, an alarm device portion 22, and a stratum portion 10, wherein, at least two of the cradle portion 4, the alarm device portion 22, and the stratum portion 10 are configured for a combined state and a separated state. In other embodiments, at least three are so configured. In yet other embodiments of these, there can be more than one of the stratum portions 10 for the combined and separated states. Any of these embodiments can include a solo-functioning alarm device portion 22 (i.e., one that does not involve the other portions(s) in the armed and not-armed states), or alarm device portion 22 that does involve one or more other portions(s) in the armed and not-armed states. Various combinations of the portions can be in the combined states of mated, interlocked, and/or locked conditions.

Consider now various examples, with group A directed to a solo functioning alarm portion 22, and group B directed to a non-solo functioning alarm portion 22, recognizing that the alarm portion may provide an option (e.g., by switch or logic intelligence (FIG. 9)) of incorporating portions other than the alarm device portion 22 in the armed and not-armed states.

A. Solo Functioning Alarm Device Portion 22

Example A1: Solo Functioning Alarm Device Portion 22 Configured for at Least One Other Portion of the Security Device System Illustratively consider a first portion generally characterized as an alarm device portion 22. The first portion is configured for operability in the separated state as an alarm device, with armed and not-armed states, devoid of any of the other portions. For example, the alarm device portion 22 is operable to detect a breach of the armed state by such as: a switch microswitch 106 in circuitry to detect whether the alarm device portion 22 is separated from a surface or object 2; and/or a detector (receiver 108) in the circuitry to detect the application of an unauthorized disarming device, i.e., a broadcast that is not from remote control 24; and/or an RF tag within the alarm device to trigger an alarm. Unlike a conventional alarm device, though, the first portion (e.g., solo functioning alarm device portion 22) is uniquely configured to be in the combined state with at least one other portion, collectively forming a security device system.

Example A2: Solo Functioning Alarm Device Portion 22 and Cradle Portion 4

The solo functioning alarm device portion 22 as in Example 1 can, but need not, be in the combined state with a second portion, e.g., the cradle portion 4. The illustrative cradle portion 4 for the alarm device portion 22 can be structured to attach or adhere the alarm device portion 22 to an object 2 being protected from consumer or employee theft. The cradle portion 4 can have an opening such as 134 for the above-mentioned switch 106 to extend through the cradle portion 4 to detect for separation from the object 2, etc. Alternatively, or additionally, the alarm device portion 22 can have a switch, or use the microswitch 106 located to intersect with an area of the cradle portion 4 so that the alarm device portion 22 can detect, during the armed state, for separation of the alarm device portion 22 from the cradle portion 4. Thus, in these examples, the first portion and the second portion are mutually structured to form the combined state, though the cradle portion 4 does not in this embodiment participate in the armed and not-armed states that are provided solely by the alarm device portion 22.

Example A3: Solo Functioning Alarm Device Portion 22 and Stratum Portion 10

The solo functioning alarm device portion 22 as illustrated above can be in the combined state with a third portion but without the second portion, e.g., with a stratum portion 10 but not with the cradle portion 4. For example, the solo functioning alarm device portion 22 can be secured to the object 2 in a combined state with the stratum portion 10. The first portion and the third portion are mutually structured to form the combined state. For example, the stratum portion 10 can have a particular dimension or characteristic, and the alarm portion 22 can be structured to accommodate that particular dimension or characteristic, yet without blocking the microswitch 106. In this case, the first portion and the third portion have a mutual structuring-enabling a combination of the third portion with the first portion that solely provides the armed and not-armed states.

Example A4: Solo Functioning Alarm Device Portion 22 and Stratum Portion 10 and Another Stratum Portion 10

This teaching example, is much like Example 3, the mutual configuring for the combined states reflects additional design constraints where more portions are mutually accommodated. So, in our teaching example, there is more constrained space for the stratum portion 10, e.g., tapes, to intersect without blocking the microswitch 106 that extends from the alarm device portion 22 to the object 2. In this case, the first portion and at least one of the third portion and the fourth portion have a mutual structuring, enabling a combination of these portions, though neither the third portion nor the fourth portion participate in the armed and not-armed states afforded by the solo functioning alarm device portion 22.

Example A5: Solo Functioning Alarm Device Portion 22 and Cradle Portion 4 and Stratum Portion 10

The above-mentioned solo functioning alarm device portion 22 can be in the combined state with at least one or both of the second portion (e.g., cradle) and a third portion (e.g., tape). For example, the solo functioning alarm device portion 22 can have a combined state with the cradle portion 4 as discussed above and with the stratum portion 10 (e.g., tape) as discussed above. Illustratively, the object 2 can be secured by the stratum portion 10 that is in the combined state with the cradle portion 4, and the cradle portion 4 is, in turn, in the combined state with the alarm device portion 22. Yet again the stratum portion 10 is structured of a particular dimension or characteristic, and the cradle portion 4 is structured to accommodate the stratum portion 10 without blocking the microswitch 106 that is located on the alarm device portion 22 to cooperate with the cradle portion 4 and the stratum portion 10 (e.g., tape). In some but not all cases, the alarm device portion 22 can have a switch to detect for separation from the cradle portion 4, the stratum portion 10, or both. The first portion, the second portion, and the third portion have a mutual structuring-enabling a combination of the second portion and the third portion, with the first portion providing the armed and not-armed states, though the second portion and the third portion do not participate in the armed and not-armed states.

Example A6: Solo Functioning Alarm Device Portion 22 and Cradle Portion 4 and Stratum Portion 10 and Another Stratum Portion 10

This Example 6, much like Example 5, can differ by adding the fourth portion as having a combined state. Thus, if a fourth portion another stratum portion 10 (e.g., another tape) is in a combined state with the alarm device portion 22, there is comparatively less space for the stratum portions 10 (e.g., tapes) to intersect and not interfere with the microswitch 106 extending though the cradle portion 4. And for embodiments with one or more switches corresponding to one or more of the stratum portions 10, there is more constrained space as well. The second, third, and fourth portions do not participate in the armed and not-armed states that are afforded by the first portion, at least some of the portions are nonetheless mutually structured for the combined state.

Example A7: Cradle Portion 4 and Stratum Portion 10

Some objects are not given to receiving an alarm device portion 22, such as a spherical object is not given to receiving conventional spider wrap as there is no planar surface for the conventional spider wrap to engage. A cradle portion 4 and a stratum portion 10 (e.g., tape(s)—second and third portions) have utility in adapting the object 2 for connection of the alarm device portion 22. In this example, none of the portions 4 and 10 provide the armed and not-armed states, but the portions 4 and 10 are mutually structured to be in the combined state, for example by accommodating a dimension and/or characteristic or the stratum portion 10, as discussed above, and at least one of the portions is mutually structured to accommodate the alarm device portion 22.

Example A8: Cradle Portion 4 and Stratum Portion 10 and Stratum Portion 10

This Example 8 is much like Example 7 above, except that the second, third, and fourth portions have the combined state. In this example, none of these portions (cradle portion 4 and more than one stratum portion 10) provide the armed and not-armed states, but these portions are mutually structured to be in the combined state as discussed above, and at least one of the portions is mutually structured to accommodate the alarm device portion 22.

Example A9: Cradle Portion 4

The cradle portion 4 can be mutually configured for the combined state with one or more portions, yet have independent utility in the separated state. For example, the cradle portion 4 can be structured to adapt the object 2 for connection to an alarm device portion 22 and/or connection to one or more of the stratum portions 10 (e.g., tapes). Illustratively, there can be an adhesive on the cradle, such as adhesive pad 102, for adherence to the object 2 and mutually structured adherence with the alarm device portion 22. Again, the cradle portion 4 can have an opening such as 134 or other accommodation for the alarm device portion 22's microswitch 106 to detect, in the alarm state, for separation from the object 2. The cradle portion 4 can also be configured for a lock pin 90.

Example A10: Stratum Portion 10

The stratum portion 10 (e.g., tape or third portion) can be a combinatiatively structured tape (third portion) to have utility in the separate state, e.g., to wrap object 2 closed, adapt the object 2 for connection to the cradle portion 4, adapt the object 2 for connection to the alarm device portion 22, etc. This stratum portion 10 (e.g., tape), unlike conventional tape, can be mutually configured for the combined state (e.g., special dimension or characteristic, such as composition) with one or more portions. Note that another combinatiatively structured stratum portions 10 (e.g., tape or fourth portion), separately or in combination with the third portion can have this same utility, though when these stratum portions 10 (e.g., tapes) are in the combined state with respect to each other, the wrapping can, for example, be in different directions-which can present special challenges, such as where a combination of electrical conductivity and insulation must be afforded by the respective tapes.

B. Non-Solo Functioning Alarm Device Portion 10

In this group of embodiments, more than one portion 4, 10, and 22, participates in the armed and not armed states. This group is much like Group A, except that one or more of the portions 4 and 10 are incorporated into the circuitry of the alarm device portion 22.

Example B1: Specially Configured Non-Solo Functioning Alarm Device Portion 10

As an alternative to A. Solo functioning alarm device, the alarm device portion 22 need not be a solo functioning alarm device, i.e., in this group of embodiments, the alarm device portion 22 is mutually structured with at least one other portion so that the at least one other portion participates in the armed and not-armed states. Similarly, any of the portions 4 and 10 can be in the separate or combined states, yet have mutual configuration to enable the desired, multiportion participation in the armed and not-armed states with other portions, as may be desired.

Example B2: Non-Solo Functioning Alarm Device Portion 10 and Cradle Portion 4

The non-solo functioning alarm device portion 22 as in Example B1 can, but need not, be in the combined state with a second portion, e.g., the cradle portion 4. The illustrative cradle portion 4 can be incorporated into circuitry with the alarm device portion 22, such that a change in the electrical signal in the circuitry triggers the alarm 118. Alarm device portion 22 can extend probes 126 to electrically communicate with cradle portion 4, e.g., at conductors 8. Likewise, in the mutual configuration, the cradle portion 4 can attach or adhere the alarm device portion 22 to an object 2 being protected. The cradle portion 4 can have an opening 134 for the above-mentioned microswitch 106 to extend through the cradle portion 4 to detect for separation from the object 2, etc. Alternatively or additionally, if so desired, the alarm device portion 22 can have a switch located to intersect with an area of the cradle portion 4 so that the alarm device portion 22 can detect, during the armed state, for separation of the alarm device portion 22 from the cradle portion 4. Cradle portion 4 can have a receptor for lock pin 90, such as opening 96. Thus, in these examples, the first portion and the second portion are mutually structured to form the combined state, such that both the cradle portion 4 and the alarm device portion 22 participate in the armed and not-armed states.

Example B3: Non-Solo Functioning Alarm Device Portion 10 and Stratum Portion 10

The non-solo functioning alarm device portion 22 as illustrated above can be in the combined state with a third portion (stratum portion 10) but without the second portion, e.g., with a tape with conductive stripe 18 but not with a cradle. For example, the non-solo functioning alarm device can be secured to the object 2 in a combined state with the conductive stripe 18 in electrical probes 126. Thusly, for example, the first portion and the third portion are mutually structured to form the combined state. For example, the tape and/or conductive stripe 18 can have a particular dimension or characteristic, and the alarm portion 22 can be structured to accommodate that particular dimension or characteristic, yet without blocking the microswitch 106. In this case, the first portion and the third portion have a mutual structuring-enabling a combination of the third portion with the first portion that collectively provide the armed and not-armed states.

Example B4: Non-Solo Functioning Alarm Device Portion 10 and Stratum Portion 10 and Another Stratum Portion 10

This teaching example, is much like Example B3, the mutual configuring for the combined states reflects additional design constraints where more portions are mutually accommodated. Again, there is more constrained space for the stratum portions 10 to intersect without blocking the microswitch 106 that extends from the alarm device portion 22 to the object 2 being protected. Electrical communication between the alarm device portion 22 and the conductive stripes 18 of the stratum portions 10 involve more mutual structuring. In this case, the first portion and the third portion and the fourth portion have a mutual structuring, enabling a combination of these portions, with all of these portions participating in the armed and not-armed states.

Example B5: Non-Solo Functioning Alarm Device Portion 10 and Cradle Portion 4 and Stratum Portion 10

The above-mentioned non-solo functioning alarm device portion 22 can be in the combined state with at least one or both of the second portion (e.g., cradle portion 4) and a third portion (e.g., stratum portion 10, e.g., a tape with conductive stripe 18). For example, the non-solo functioning alarm device portion 22 can have a combined state with the cradle portion 4 as discussed above and with the conductive stripe 18 as discussed above. Illustratively, the object 2 can be secured by the stratum portion 10 (e.g., tape) that is in the combined state with the cradle portion 4, and the cradle portion 4 is, in turn, in the combined state with the alarm device portion 22. Yet again the tape and/or conductive stripe 18 is structured of a particular dimension or characteristic, and the cradle portion 4 is structured to accommodate the stratum portion 10 without blocking the microswitch 106 that is specially located on the alarm device portion 22 to cooperate with the cradle portion 4 and the stratum portion 4. In some but not all cases, the alarm device portion 22 can have a switch to detect for separation from the cradle portion 4. The first portion, the second portion, and the third portion have a mutual structuring-enabling a combination of the second portion and the third portion with the first portion all participating in the armed and not-armed states.

Example B6: Non-Solo Functioning Alarm Device Portion 10 and Cradle Portion 4 and Stratum Portion 10 and Stratum Portion 10

Example B6, much like Example B5, can differ by adding the fourth portion as having a combined state. Thus, if a fourth portion (e.g., another stratum portion 10, such as another tape) is in a combined state with the alarm device portion 22, there is comparatively less space for the tapes to intersect and not interfere with the microswitch 106 extending though the cradle portion 4. And for embodiments with one or more switches/probe 126 sets corresponding to one or more of the tapes, there is more constrained space as well. The second, third, and fourth portions all participate in the armed and not-armed states with the first portion-all in this case mutually structured for the combined state.

Example B7: Cradle Portion 4 and Stratum Portion 10

Again as above, certain objects are not given to receiving an alarm device, such as a spherical object is not given to receiving spider wrap as there is no planar surface for the spider wrap to engage. In such a case, a cradle portion 4 and a tape embodiment of the third portion (stratum portion 10) have utility in adapting the object 2 for connection of the alarm device portion 22. In this example, none of the portions provide the armed and not-armed states, but the portions are mutually structured to be in the combined state as discussed above, and these portions is mutually structured to accommodate the alarm device portion 22 and participate in the armed and not armed states.

Example B8: Cradle Portion 4 and Tape and Stratum Portion 10

Example B8 is much like Example B7, except that the second, third, and fourth portions have the combined state and in that combined state are adapted to participate in the armed and not armed states when in the combined state with alarm device portion 22. In this example, none of the portions provide the armed and not-armed states, but the portions are nonetheless mutually structured to be in the combined state as discussed above, and at least one of the portions is mutually structured to accommodate the alarm device portion 22.

Example B9: Cradle Portion 4

The cradle portion 4 can be mutually configured for the combined state with one or more portions, yet have independent utility in the separated state. For example, the cradle portion 4 can be, as above, structured to adapt a package or object 2 for connection to an alarm portion 22 and/or connection to one or more of the stratum portions 4. Illustratively, there can be an adhesive on the cradle portion 4 for adherence to the object 2 and mutually structured adherence with the alarm device portion 22 and/or cradle portion 4. Again, the cradle portion 4 can have an opening 134 or other accommodation for the alarm device portion 22's microswitch 106 to detect, in the alarm state, for separation from a protected object.

Example B10: Stratum Portion 10

The stratum portion 10 (third portion) can be structured to combine, e.g., in a tape embodiment, or to have utility in the separate state, e.g., to wrap a package closed, adapt an object 2 for connection to the cradle portion 4, adapt the object 2 for connection to the alarm portion 22, etc. This tape, unlike conventional tape, can be mutually configured for the combined state (e.g., special dimension or characteristic, such as composition) with one or more portions of the security device system. Note that another combinatiatively structured stratum portion 10 (fourth portion) e.g., tape embodiment, separately or in combination with the aforesaid third portion can have this same utility, though when the tapes are in the combined state with respect to each other, the wrapping can, for example, be in different directions-which can present special challenges, such as where a combination of electrical conductivity and insulation must be afforded by the respective tapes.

C. Alarm Device Portion 10 that Provides an Option for Separate or Combined States In variations of the above-provided examples, the alarm device portion 22 can provide an option to combine or not combine with another portion that participates in the armed and not-armed states, i.e., to optionally operate as a solo functioning alarm device portion 22 or as a non-solo functioning alarm device portion 10. For example, the option can be provided by alarm device portion 22 employing one or more switches to selectively enable a combined state in which one or more other portions participates in the armed and not armed states. As another example, the alarm device portion 22 can itself detect for one or more other portions (as illustrated in FIG. 9). If another portion is detected in the combined state, then the portions participate in the armed and not armed states; and if another portion is not detected, then the alarm device operates as a solo functioning alarm device.

D. Mixed Variations

In variations of the above-provided examples, the portions can be in the combined state and have some but not all of the portions in the combined state participate in the armed and not-armed states, and mutually configured accordingly. And in the examples A, B, and C above, the combined state can be in mated, interlocked, and/or locked conditions-depending on the embodiment preferred in one situation or another.

In sum, with respect to the description herein, numerous specific details are provided, such as examples of components and/or methods, to provide a thorough teaching and understanding of embodiments and underlying principles. One skilled in the relevant art will recognize, however, that an embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments.

Similarly, embodiments can be implemented in many forms, and based on the disclosure and teachings provided herein, a person of ordinary skill in the art will appreciate other ways and/or methods to implement an equivalent. Reference throughout this specification to "one embodiment", "an embodiment", or "a specific embodiment" means that a particular feature, structure, or characteristic described in connection with the embodiment is included in at least one embodiment and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present invention.

It will also be appreciated that one or more of the elements depicted in the drawings/Figures can also be implemented in a more separated or integrated manner, or even removed or rendered as otherwise operable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments, including what is described in the Abstract and the Summary, are not intended to be exhaustive or to limit the invention to the precise forms disclosed herein. While specific embodiments of, and examples for, the invention are described herein for teaching-by-illustration purposes only, various equivalent modifications are possible within the spirit and scope of the present invention, as those skilled in the relevant art will recognize and appreciate. As indicated, these modifications may be made in light of the foregoing description of illustrated embodiments and are to be included within the true spirit and scope of the disclosure herein provided.

The invention claimed is:

1. A method of protecting an object, the method including:
    protecting an object by installing a stratum and circuitry,
        the installing of the stratum including applying some of the stratum to the object, overlapping some of the stratum with itself, and
        the installing of the circuitry including installing circuitry configured to detect whether there is an electrical change in the circuitry and configured to have an armed state and a not-armed state, such that when in the armed state, the circuitry triggers an alarm upon a detection of the electrical change, the circuitry including a switch that, when triggered, disrupts electricity in the circuitry during the armed state, the switch having an end that is more proximate the object than some of the stratum and located so as to be triggered by separation of the end of the switch from the object.

2. The method of claim 1, wherein the protecting includes joining an alarm portion having some of the circuitry with a cradle portion having some of the circuitry so that the switch is triggered by separation of the alarm portion and the cradle portion.

3. The method of claim 2, wherein the joining includes screwing the alarm portion into the cradle portion.

4. The method of claim 2, wherein the joining blocks access to a replaceable battery compartment.

5. The method of claim 1, wherein the stratum comprises a first stratum and the protecting includes applying some of a second stratum to the object, overlapping some of the second stratum with itself and some of the first stratum.

6. A method including:
    installing a stratum, that overlaps some of itself, in combination with circuitry configured to detect whether there is an electrical change in the circuitry and configured to have an armed state and a not-armed state, such that when in the armed state, the circuitry triggers an alarm upon a detection of the electrical change, the circuitry including a switch that, when triggered, disrupts electricity in the circuitry during the armed state, the switch having an end that, when the circuitry and the stratum are installed to protect an object, is more proximate the object than at least some of the stratum so as to be triggered by separation of the end of the switch from the object.

7. The method of claim 6, wherein the installing includes joining an alarm portion having some of the circuitry with a cradle portion having some of the circuitry so that the switch is triggered by separation of the alarm portion and the cradle portion.

8. An apparatus including:
    circuitry configured to detect whether there is an electrical change in the circuitry and configured to have an armed state and a not-armed state, such that when in the armed state, the circuitry triggers an alarm upon a detection of the electrical change; and
    a stratum, having an overlap of some of itself, in combination with the circuitry;
    wherein the circuitry includes a switch that, when triggered, disrupts electricity in the circuitry during the armed state, the switch having an end that, when the circuitry and the stratum are installed to protect an object from theft, is more proximate the object than at least some of the stratum and located so as to be triggered by separation of the end of the switch from the object.

9. The apparatus of claim 8, wherein some of the circuitry is included in an alarm portion and some of the circuitry is in a cradle portion, and the overlap is intermediate the alarm portion and the cradle portion.

10. The apparatus of claim 8, wherein:
    the circuitry spans an alarm portion and a cradle portion,
    the switch is located in the alarm portion, and
    the switch, when the circuitry and the stratum are installed to protect the object from theft, is triggered by separation of the alarm portion from the cradle portion.

11. The apparatus of claim 8, wherein a spring-loaded plunger includes the end of the switch.

12. The apparatus of claim 8, wherein the circuitry includes a conductive stripe in the stratum.

13. The apparatus of claim 8, wherein the stratum includes an adhesive tape.

14. The apparatus of claim 8, wherein the stratum comprises thermoplastic.

* * * * *